United States Patent [19]
Faulstich

[11] Patent Number: 5,765,974
[45] Date of Patent: Jun. 16, 1998

[54] METHOD FOR MACHINING TOOTH FLANKS OF WORKPIECES WITH A PROFILED SHAPED TOOL

[75] Inventor: Ingo Faulstich, Ludwigsburg, Germany

[73] Assignee: Hermann Pfauter GmbH & Co., Germany

[21] Appl. No.: 768,904

[22] Filed: Dec. 17, 1996

Related U.S. Application Data

[63] Continuation of Ser. No. 565,294, Nov. 30, 1995, abandoned, which is a continuation of Ser. No. 186,234, Jan. 25, 1994, abandoned, which is a continuation of Ser. No. 688,747, Apr. 19, 1991, abandoned.

[30] Foreign Application Priority Data

Apr. 19, 1990 [DE] Germany ............... 40 12 432.0

[51] Int. Cl.$^6$ .................................................. B23F 9/00
[52] U.S. Cl. .................... 409/51; 409/38; 409/41; 451/47; 451/147
[58] Field of Search ............... 409/12, 31, 33, 409/38, 41, 50, 56, 57, 51; 451/47, 140, 143, 147

[56] References Cited

U.S. PATENT DOCUMENTS

| | | |
|---|---|---|
| 3,916,569 | 11/1975 | Wydler et al. . |
| 4,638,599 | 1/1987 | Maier ........................................ 451/147 |
| 4,815,239 | 3/1989 | Sommer . |
| 4,850,155 | 7/1989 | Sulzer . |
| 4,954,027 | 9/1990 | Faulstich .................................. 409/26 |
| 4,961,289 | 10/1990 | Sulzer . |

FOREIGN PATENT DOCUMENTS

| | | |
|---|---|---|
| 200074 | 3/1983 | Germany . |
| 3816270 | 11/1989 | Germany . |

*Primary Examiner*—Daniel W. Howell
*Attorney, Agent, or Firm*—Leydig, Voit & Mayer, Ltd.

[57] ABSTRACT

A method for machining of tooth flanks by grinding or milling respectively as to internally or externally toothed workpieces with a profile disk tool in a discontinuous indexing process. For generating flanks with complicated flank modifications it is proposed to perform during machining besides the known movements an additional movement that is composed of at least two portions, extending in different axes of the machine, whereby the individual portions are so matched that a prescribed distortion of the flanks results. There are embodiments for single flank processes and for double flank processes. It is also possible to generate topological flank modifications and flanks, of which certain parts are set back relative to the unmodified area of the flank. Basis for determining the tool- and workpiece setting data and the movements that the tool has to perform relative to the workpiece, is a simulation of the machining process on a computer.

19 Claims, 6 Drawing Sheets

METHOD FOR MACHINING TOOTH FLANKS OF WORKPIECES WITH A PROFILED SHAPED TOOL

This application is a continuation of U.S. Ser. No. 08/565,294, filed Nov. 30, 1995, now abandoned, which is a continuation of U.S. Ser. No. 08/186,234, filed Jan. 25, 1994, now abandoned, which is a continuation of U.S. Ser. No. 07/688,747, filed Apr. 19, 1991, now abandoned.

BACKGROUND OF THE INVENTION

1. Field of the Invention

The present invention pertains to a method for machining by grinding or milling of tooth flanks of workpieces having internal and external teeth respectively with such machining being undertaken via a profiled disk-shaped tool as set forth in greater detail subsequently herein. A method and an apparatus for carrying out such method of tooth-flank grinding and milling of internal and external teeth, respectively, can be found in this disclosure.

2. Description of the Prior Art

The flanks of cylindrical gears in most cases are based upon involute helicoid surfaces. Gears having flanks formed of exact involute helicoid surfaces normally do not result in optimal operating performance; for this reason flank modifications are required by the design engineer thereof.

Simple and complicated flank modifications exist.

Simple modifications are profile modifications (tip relief, root relief, profile slope modification, profile barrelling) when these only are to be maintained in one measuring plane, for example, in the transverse plane containing face-width center. Simple modifications are also helix modifications (helix slope modification, end relief, helix crowning), when these are to be maintained only upon one cylinder, for example, upon the pitch cylinder.

More complicated modifications are characterized thereby that requirements are to be fulfilled about profile modifications in different transverse sections and/or about helix modifications on different cylinders.

In the most complicated case, the design engineer establishes a network of measuring points upon the flank and sets forth for each of these points by which amount this point projects or is retracted with respect to the involute helicoid. The object is to generate an uniformly extending surface upon which all prescribed points are located or from which these points at most have a maximum tolerated distance. Modifications of the type described hereby are designated as topological modifications.

Simple flank modifications can be produced in a known method wherein the desired profile modification in essence is placed in the tool and the helix modification is generated via a corresponding machine movement.

A method is also known with which a desired profile modification is generated in that the flank is machined in several passes with different setting data including, for example, center distance a, eccentricity e of the tool, swivel angle η, and initial angle of workpiece rotation ψ, but during machining the machine movement is unchanged.

More complicated modifications in the sense set forth by the foregoing and especially topological modifications cannot be produced by way of the known method. Profile methods provide advantages compared with other methods. The advantages are concerned particularly with a great range of workpiece dimensions, and machining time.

Reference can be made to a German Offenlegungsschrift 38 16 270-Faulstich dated Aug. 23, 1990 corresponding to U.S. Pat. No. 4,954,027-Faulstich dated Sep. 4, 1990, each belonging to the assignee of the present invention. The description of the prior art will be noted for comparison purposes in greater detail subsequently herein.

SUMMARY OF THE INVENTION

An object of the present invention resulting from the foregoing circumstances concerns further development of the method of the genus under consideration such that also more complicated flank modifications as far as topological modifications can be produced therewith. This problem is solved with the present inventive method in that for production of more complicated flank modifications besides the movement required for production of simply modified flanks there is also carried out an additional movement using a suitably adapted and suitably positioned tool, whereby the movement is composed of at least two portions extending in different axes of the machine, whereby the individual portions are so adapted for machines attuned that the desired flank modifications will be generated. With the apparatus, provision is made such that during the machining dependent upon momentary axial slide position when the tool is swivelling about an axis which corresponds to the shortest connection of the tool and workpiece axes, the tool is at least being able to carry out movements having components in the direction of the above mentioned swivelling axis.

The present inventive method essentially increases the flexibility of the flank topography producible in the profile method with disk-shaped tool means. For this reason the designation of the present invention is set forth as the Topoflex-method.

BRIEF DESCRIPTION OF THE DRAWINGS

This object, and other objects and advantages of the present invention will appear more clearly from the following specification in conjunction with the accompanying drawings.

DESCRIPTION OF PREFERRED EMBODIMENTS

In the production of helical teeth in a discontinuous profiling process, there will be distorted flanks when the teeth have a helix crown. The distortion shows up at profile measurement as a profile-slope deviation, the amount of which differs in all transverse sections.

Assuming a course of the helix crown according to a square parabola across the face width, one obtains a profile slope deviation in different transverse planes, which is in good approximation proportional to the distance between the measurement planes. If one designates the measurement plane closest to the reference face as I and the measurement plane closest to the non-reference face as II, one obtains the distortion $S_\alpha$ of the profile as defined in the following equation:

$$S_\alpha = f_{H\alpha II} - f_{H\alpha I} \tag{1}$$

Here $f_{H\alpha}$ is the profile-slope deviation according to DIN 3960 (German Industrial Norm).

Simultaneously with the distortion $S_\alpha$ of the profile there occurs a distortion $S_\beta$ of the helix. The distortions $S_\alpha$ and $S_\beta$ however, only represent different forms of the description of the same effect. In the following description for this reason only the distortion $S_\alpha$ is considered.

The situation exists, in which the designer desires flanks without distortion or flanks with a distortion $S_\alpha$, which differs from the distortion $S_{\alpha V}$, due to the conventional process. In this situation an additional distortion defined by the following equation:

$$S_{\alpha\alpha} = S_\alpha - S_{\alpha V} \tag{2}$$

would be necessary, which produces the desired distortion $S_\alpha$ when superimposing the distortion $S_{\alpha V}$ due to the conventional process.

As known from the previously mentioned U.S. Pat. No. 4,954,027, the profile deviation $F_\alpha$,—which arises when the setting data do not correspond to the design data including namely the center distance a, eccentricity e of the tool, swivel angle η (it is η=90°—crossing angle ε of the axes of workpiece and tool) and the initial angle ψ of workpiece rotation—can be divided into a profile slope deviation $f_{H\alpha}$, a profile barrelling $c_\alpha$, a profile form deviation $f_{f\alpha}$, and a quantity defining the tooth thickness. If one chooses the amount of stock per flank $q_r$ on a certain cylinder in a transverse plane as a measure to describe the tooth thickness, the following equation applies:

$$F_\alpha = q_r + f_{H\alpha} + c_\alpha + f_{f\alpha} \tag{3}$$

Figure 1:
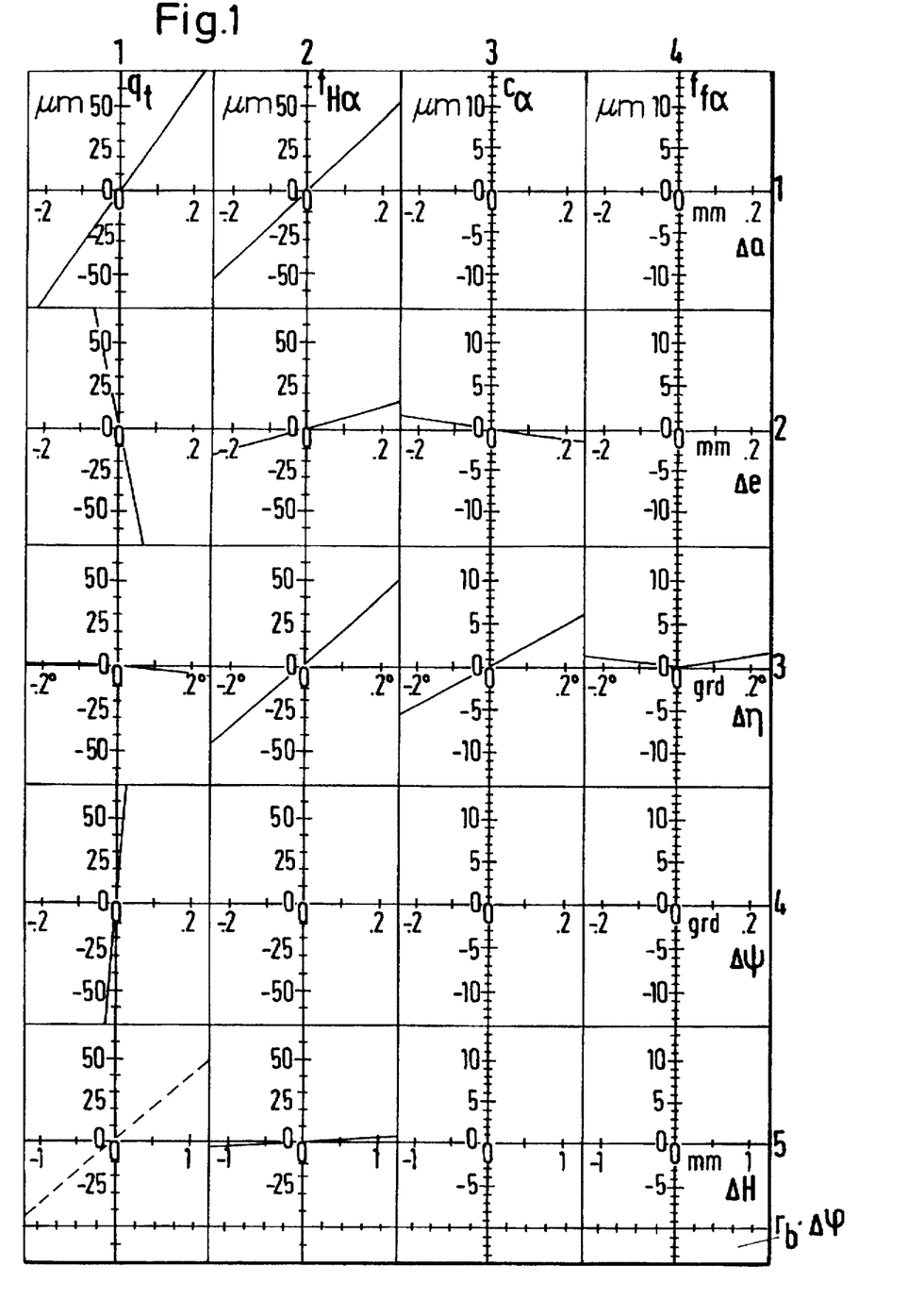
FIG. 1 is a view that illustrates interrelationships for a concrete machining example involving features of interest as to the present invention.

In the previously noted U.S. Pat. No. 4,954,027, there is proposed to determine the effect of the setting data on the components of a profile modification experimentally. If this consideration is supplemented by the influence which results from a rotational component of a screw movement during machining not corresponding to the required lead H, interrelationships of interest in the present situation clearly can be represented for a concrete machining example according to the illustration in FIG. 1. The example is valid for a machining of the right flanks of right-hand gear with:

$z_2$=38, m=8.467 mm, α=17.5°,
β=+27.5°, b=171 mm, $L_\beta$=b.

The foregoing symbols have the following meaning:

$z_2$ number of teeth
m module
α pressure angle
β helix angle
b face width
$L_\beta$ helix evaluation range Each line in FIG. 1 contains the effect of a parameter upon $q_r$ (Column 1), $f_{H\alpha}$ (Column 2), $c_\alpha$ (Column 3) and $f_{f\alpha}$ (Column 4). It has to be observed that in Columns 1 and 2 there has been selected a coarser scale than in Columns 3 and 4.

In lines 1 through 3 of FIG. 1, the setting data of the tool pertaining to center distance a (line 1), eccentricity e (line 2), and swivel angle η (line 3) are shown. In addition, line 4 pertains to the initial angle ψ of workpiece rotation, and the line 5 pertains to the rotational component φ of the screw movement realized via a corresponding machine movement.

Changes of center distance a and eccentricity e of the tool have a strong effect upon the amount of stock $q_r$ and the profile slope deviation $f_{H\alpha}$, but hardly any effect on profile barrelling $c_\alpha$ and the profile-form deviation $f_{f\alpha}$. For example, Δa=100 μm brings about a $c_\alpha \approx 0$ as well as a $f_{f\alpha} \approx 0.1$ μm and a Δe=100 μm brings about a $c_\alpha$ φ≈0.6 μm as well as a $f_{f\alpha} \approx 0$.

Changes of swivel angle η likewise have a strong effect upon the profile slope deviation $f_{H\alpha}$. They have a considerably less strong effect than the center distance a and the eccentricity e of the tool upon the amount of stock per flank $q_r$ in a transverse plane, but a more strong effect than the center distance a and the eccentricity e of the tool upon the profile barrelling $c_\alpha$ and the profile form deviation $f_{f\alpha}$. Accordingly Δη=0.1° causes a $c_\alpha \approx 2.5$ μm and a $f_{f\alpha}$=0.6 μm.

A change of the initial angle of the workpiece rotation ψ influences neither the profile slope deviation $f_{H\alpha}$ nor the profile barrelling $c_\alpha$ nor the profile-form deviation $f_{f\alpha}$, but rather influences only the amount of stock per flank $q_r$. With the initial angle of workpiece rotation ψ there is a measure available over which the desired tooth thickness can be easily realized at single flank operation, without thereby influencing the profile of the flank.

The change of the screw produced over the machine movement is characterized in line 5 by a change of the lead H. The quantity H in conjunction with the flank topography, however, is not clearly evident. For this reason the quantity H is converted into the rotational component of the screw, based on the facewidth of the workpiece or into an arc $r_b \times \psi$ upon the base circle of the workpiece.

The base circle radius $r_b$ used here is the radius that can be calculated according DIN 3960, without taking into account a desired bending of the flanks.

Line 5 contains a second scale for $r_b \times \Delta\phi$.

As to the amount of stock per flank $q_r$ in line 5, column 1 of FIG. 1, it should be noted that $q_r$ here takes into consideration only the portion resulting from the change of $F_\alpha$ on stock. One recognizes that in the illustrated range of Δφ this portion is practically 0. The additional rotation Δφ generates however at single flank operations a change of $q_r$, extending proportional to the path z of the axial slide of the machine, since the following equation applies:

$$q_r(z) = \frac{v_b \cdot \Delta\rho}{L_B} \cdot z \tag{4}$$

This portion is shown by a broken line in line 5, column 1, in FIG. 1.

It is now proposed to change the center distance a and/or the eccentricity e of the tool and/or the swivel angle η during the axial slide movement and so to generate a distortion $S_\alpha$ of the profile. Simultaneously, the helix deviation resulting thereby is compensated for by adjusting the screw movement.

Figure 2:
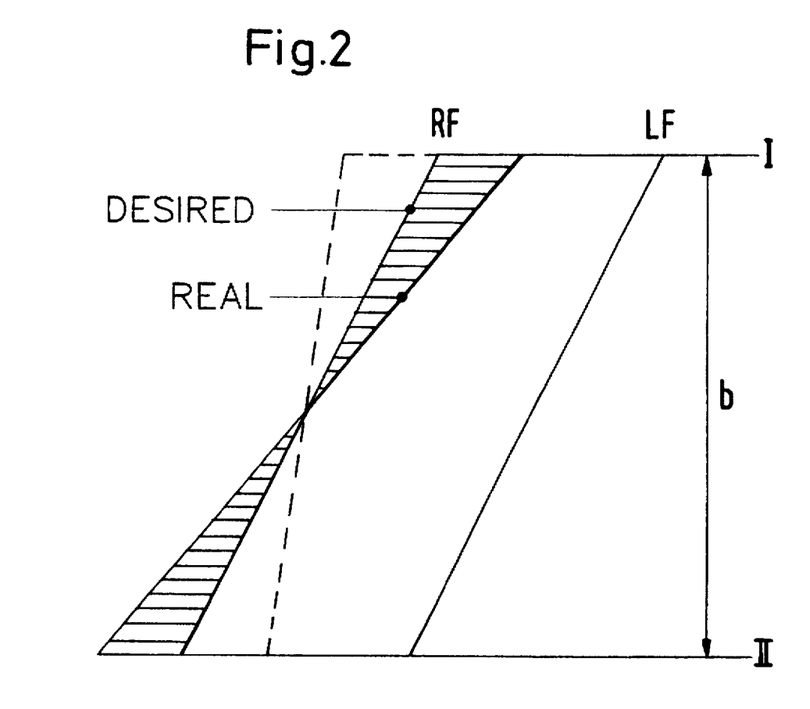
FIG. 2 is a view that shows the helix angle of an helical gear with helix crowning produced by the conventional method and by the proposed method respectively in a single flank process.

There is set forth the generation of a distortion of the flanks $S_\alpha$, via a change of the center distance a. For example, if the center distance a is changed proportional to the axial slide path z, in such a way that in the plane I $\Delta a_I=-50$ µm and in the plane II $\Delta a_{II}=+50$ µm occur, one can read off from line 1, column 2 in FIG. 1 $f_{H\alpha I}=-10.85$ µm and $f_{H\alpha II}=+10.85$ µm and then from equation (1) calculate the distortion of the profile $S_\alpha=21.7$ µm. From line 1, column 1 of FIG. 1, there follows for the above noted values of $\Delta a$ in planes I and II, respectively, a stock per flank of $q_{tI}=-15.65$ µm and $q_{tII}=+15.65$ µm. Under the conditions set forth here, the right flanks RF of the resulting teeth, as illustrated in FIG. 2, would have too large of a helix angle and too small of a lead (REAL helix in FIG. 2). In order to compensate for this effect, the machine movement must be so adjusted that an additional rotation $r_b\times\Delta\phi=31.3$ µm with reference to the face width b is generated as long as the center distance a is not altered. With the alteration of the center distance in combination with the additional rotation, the desired helix angle will be obtained (DESIRED helix in FIG. 2).

The additional rotation $r_b\times\Delta\phi$ can be understood in the present situation because of the practically linear interrelationships as helix slope modification $M_{H\beta}$. With machines having corresponding control this value can be input directly into the control means; the machine then executes the desired additional rotation automatically during machining.

From line 5, column 2 in FIG. 1 it is apparent that with a variation of H there results a profile slope deviation $f_{H\alpha}$. For this reason it could be presumed that the generated profile-slope deviation in the planes I and II as a consequence of $\Delta H$ must be corrected. For such a correction a change of the aforementioned center distances in the planes I and II would be suitable, for example. In reality this "correction" however cannot be permitted to be carried out since $\Delta H$ is only required in order to assure that the correct helix is generated on the workpiece. The correct helix, however is preconditioned on the workpiece when calculating the dependencies in the lines 1 through 3 of FIG. 1. The profile slope deviation contained in line 5, column 2 in FIG. 1 would actually result, when the generated helix would have a corresponding helix slope deviation $f_{H\beta}$; this however is not the case.

It has already been noted that, in the example considered herewith, practically linear relationships exist for $f_{H\alpha}$ ($\Delta a$), $q_t$ ($\Delta a$), $f_{H\alpha}$ ($\Delta\phi$) and $q_t$ ($\Delta\phi$). With that, practically linear relationships also result for the modification of center distance $\Delta a$ (z) and additional rotation $\Delta\phi(z)$. It is not in all situations permissible to linearize the interrelationships necessary for bringing about machine movements. In such situations one can divide the toothing to be generated into several narrow sets of toothings for the calculation, apply the aforementioned method for each individual narrow set of toothings and join the results together. This means that stronger non-linear extending functions are linearized in sections and the results subsequently joined together. Then one obtains for $\Delta a(z)$ and $\Delta\phi(z)$ non-linear relationships (in sections linear relationships). The realization of these dependencies via the machine is at least easily possible with numerically-controlled machines.

The interrelationships required for control of the movement of the machine can be determined especially conveniently via a simulation of the manufacturing process on a digital computer, because with this method the calculation also is capable of being carried out in a short time, even if non-linear interrelationships exist and because thereby automatically the—normally small—displacement of the contact points between the tool and the workpiece can automatically be taken into consideration.

The previously set forth manner of proceeding presupposes that the individual effects do not influence each other, that accordingly, for example, when using a predetermined $\Delta e$ for the remaining setting data the interrelationships originally determined are valid without change. More accurate results are obtained when actually selected combination of tool-setting data and screw movement are used as the basis for a computer simulation of the manufacturing process and thereby the profile to be expected is calculated. One produces for example via $\Delta a$, a profile slope deviation $f_{H\alpha}$ and a $q_t$ and iterates subsequently $\Delta a$ and $\Delta\phi$ until upon the measuring cylinder a point with the required z-component lies upon the required helix.

This method naturally is also applicable when the profile slope modification to be generated should not vary proportional to the displacement of the axial slide.

As a result there are obtained, for example, the path coordinates in relation to the respective position of the axial slide (z-position) or directly the NC-program for the machine.

The required distortion of the profile $S_\alpha$, also can be produced inventively rather than via $\Delta a$ (z) and $\Delta\phi$ (z) also via $\Delta e$ (z) and $\Delta\phi(z)$ respectively via $\Delta\eta$ (z) and $\Delta\phi(z)$ as well as via combinations of such functions. For each $\Delta\phi(z)$ there is valid in the aforementioned situations naturally quantitatively a different relationship. This results necessarily from FIG. 1, when the method for $\Delta a(z)$ and $\Delta\phi(z)$ as set forth is transferred upon the remaining cases.

When producing $S_\alpha$ by means of $\Delta e$ (z) and $\Delta\phi(z)$ respectively $\Delta\eta(z)$ and $\Delta\phi(z)$ there is to be observed that besides the desired distortion of the profile there occurs a small profile barrelling and a small negative profile barrelling, respectively, of which the amount varies with the axial path (see the lines 2 and 3, column 3 in FIG. 1). The negative profile barrelling can be avoided in that in the example at hand for $\Delta e$ only values smaller than 0 and for $\Delta\eta$ only values greater than 0 are permitted. For this purpose attention is directed to lines 2 and 3, column 3 in FIG. 1. If, for example, the distortion of the profile $S_\alpha$ over $\Delta\eta(z)$ and $\Delta\phi(z)$ is to be produced, values for $c_\alpha<0$ (which means concave curvature) are to be avoided, and the range in which $\Delta\eta(z)$ is varied could lie substantially symmetrically around $\Delta\eta=+0.1°$. The profile slope deviation $f_{H\alpha}=20$ µm resulting according to line 3, column 2 in FIG. 1 can be compensated for by an adjustment of the center distance corresponding to line 1, column 2 in FIG. 1. The adjustment of the center distance required is constant; and accordingly does not vary with the movement of the axial slide. The increase of $q_t$ (see line 1, column 1) connected with the adjustment of a, can be easily compensated for via $\Delta\psi$ (see line 4, column 1 in FIG. 1). Naturally, it is also possible to take into consideration the expected profile slope deviation already when designing the tool. In this case, one can dispense with the alteration of center distance a and initial angle of workpiece rotation $\psi$.

Attention is once again directed thereto that for $\Delta\eta\approx 0$ always a small profile form deviation $f_{f\alpha}$ occurs (see line 3, column 4 in FIG. 1). Consequently one should always check whether this deviation can be accepted or not.

The profile form deviation $f_{f\alpha}$ to be expected extends basically S-shaped over the length of roll. Since the amplitude varies over the axial path, a complete compensation is not possible via the tool design. It is only possible to take into consideration a value to be expected in the face width center. The remaining form deviation could be approximately halved over the face width. In the present example, however, there is noted that the form deviation to be expected is so small that there can be disregarded any compensation thereof, when the accuracy requirements to be fulfilled are not extremely high. If form deviations not to be tolerated remain, one would dispense with the generation of the distortion of the profile $S_\alpha$ over $\Delta\eta(z)$ and $\Delta\phi(z)$ and select an alternative solution.

The proposed method does not operate with constant setting data. This leads to displacements of the points of the tool producing the workpiece profile. This displacement can be calculated when simulating the production process and taken into account when fixing the useable tool-profile height. In certain situations the useable height of the tool profile must be somewhat enlarged relative to the standard design and in other situations the same could be selected somewhat smaller. If the investigation is not carried out on a computer, the useable height should be enlarged by at least $\Delta a/2$ in the tip region and in the root region of the tool.

The dependencies shown in FIG. 1 are valid as mentioned for the right flanks of a right hand helical gear. If corresponding investigations are carried out for the left flanks of this gear, aside from the second and fourth line in FIG. 1, the same quantitative interrelationship as with the right flank. In lines 2 and 4 there are mirrored the curves on the respective abscissa; the straight lines have corresponding gradients with the values valid for the right flanks, but with opposite sign.

Figure 3:
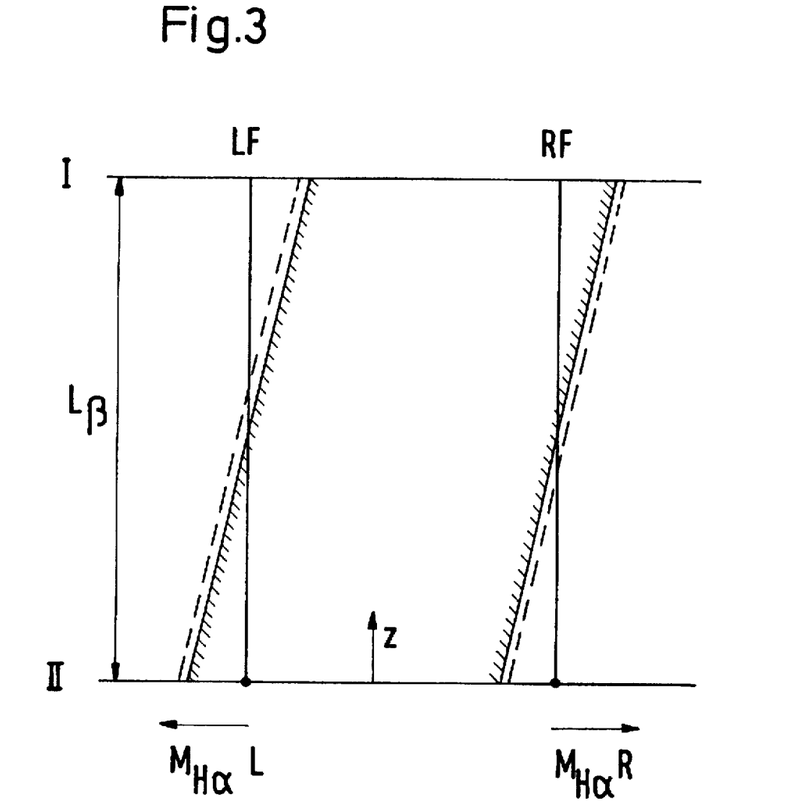
FIG. 3 is a view that shows the profile slope modifications of a helical gear produced in a double flank process, whereby the modifications are generated via a change of the tool offset and a change of the additional rotation of the workpiece, both dependent on the instantaneous position of the axial slide to compensate for the undesired distortion of the flanks.

This situation can be utilized so as to apply the proposed method also to double flank machining. One interesting example: a gearing is to be machined in a double flank process with a parabola-shaped helix crowing $c_\beta=20$ µm, with respect to the entire face width. The distortion of the profile of the left flank amounts to $S\alpha L=+10$ µm, and the distortion on the right flank amounts to $S_{\alpha R}=-10$ µm. These distortions are now to be avoided. FIG. 3 shows the profile slope modifications $M_{H\alpha L}$ and $M_{H\alpha R}$ to be produced over the face width (full lines).

In order to generate the required distortion of the right flank RF, there must be realized in the planes I and II an offset equal to $e_{II}=\Delta e_{II}\approx+5$ µm/$0.064\approx+78$ µm and $e_I=\Delta e_I\approx-78$ µm. The factor 0.064 is the gradient of the function in FIG. 1, line 2, column 2. Between planes I and II, respectively, the eccentricity e should be interpolated linearly and beyond the planes I and II it should be extrapolated linearly.

The herein described additional movement does not yet produce the desired result. First of all, it is through the additional rotation as already set forth for the single flank process to be so determined that the desired helix actually is generated. In the present situation this adjustment is achieved via the function in FIG. 1, line 2, column 1.

Secondly, the positioning of the tool is to be adapted; in the present example the required correction amounts, however, as will still be shown are negligibly small.

Because of the fact that with double flank machining of helical teeth "simultaneously" generated points upon both flanks will have different z-components, when measured on the same cylinder changes of the profile slope modifications $M_{H\alpha}$ (z) result as shown by the broken lines in FIG. 3.

It is clear that the eccentricities of the tool in the planes I and II influence the profiles of the right flanks and left flanks in an undesirable manner. The required distortion of the profiles exist on both flanks; in all locations however there exist too large $M_{H\alpha}$-values. These could be avoided via a variation of the center distance a according to line 1, column 2 in FIG. 1 respectively via a swivel angle variation $\Delta\eta$ according to line 3, column 2 in FIG. 1. For that the tool positioning would be slightly adapted via $\Delta a=-1$ µm respectively via $\Delta\eta=-4"$. In the example at hand naturally this correction can be dispensed with.

The example described in the foregoing concerns a double flank machining with parabolic extending helix crowning which is generated via a practically likewise parabolic extending variation of the center distanced $\Delta a(z)$. The fact that the distortion of the profile due to the conventional process $S_{\alpha\nu}$ was eliminated does not mean however that now in all transverse sections $f_{H\alpha}$ is constant but rather only that in the measuring planes I and II equal $f_{H\alpha}$ values exist (i.e., $f_{H\alpha I}=f_{H\alpha II}$). Actually, in the present example, the $f_{H\alpha}$ becomes greater toward the middle of the face width. In the middle of the face width, accordingly, the tip of the tooth protrudes compared with the situations in the planes I and II. The explanation of this effect is obtained from the variation of the center distance $\Delta a$ (z) taking into consideration the interrelationship according to line 1, column 2 in FIG. 1. It is possible, over the face width to generate a constant profile slope deviation $f_{H\alpha}$ or a profile slope deviation $f_{H\alpha}$ (z) extending according to a prescribed rule via a further movement, namely via a movement upon the path $\Delta\eta(z)$ adapted to the desired dependence $f_{H\alpha}$ (z).

The tools required for the Topoflex-method at double-flank machining differ only slightly from conventionally employed tools. For the Topoflex-method the tools must be adapted in the thickness to the influences on tooth thickness resulting from the respective additional movements. Additionally, the tool in the region adapted to the workpiece geometry must attain adequate safety for the displacement of the contact points as a consequence of the changed setting data $\Delta a$, $\Delta e$, $\Delta\eta$ and $\Delta H$.

Topological flank modifications also can be generated according to the Topoflex-method. Topological modifications are desired for example on gear shaving tools, roller gears, dressing gears and also among others on large, highly accurate gears in ship- or turbine drives. The method can be described as set forth in the following paragraphs.

The design engineer, as indicated by the foregoing specifies a network of measuring points upon the flank and for each of these points sets forth by which amount compared to the unmodified involute helicoid there is to be projection or retraction in location.

Figure 4:
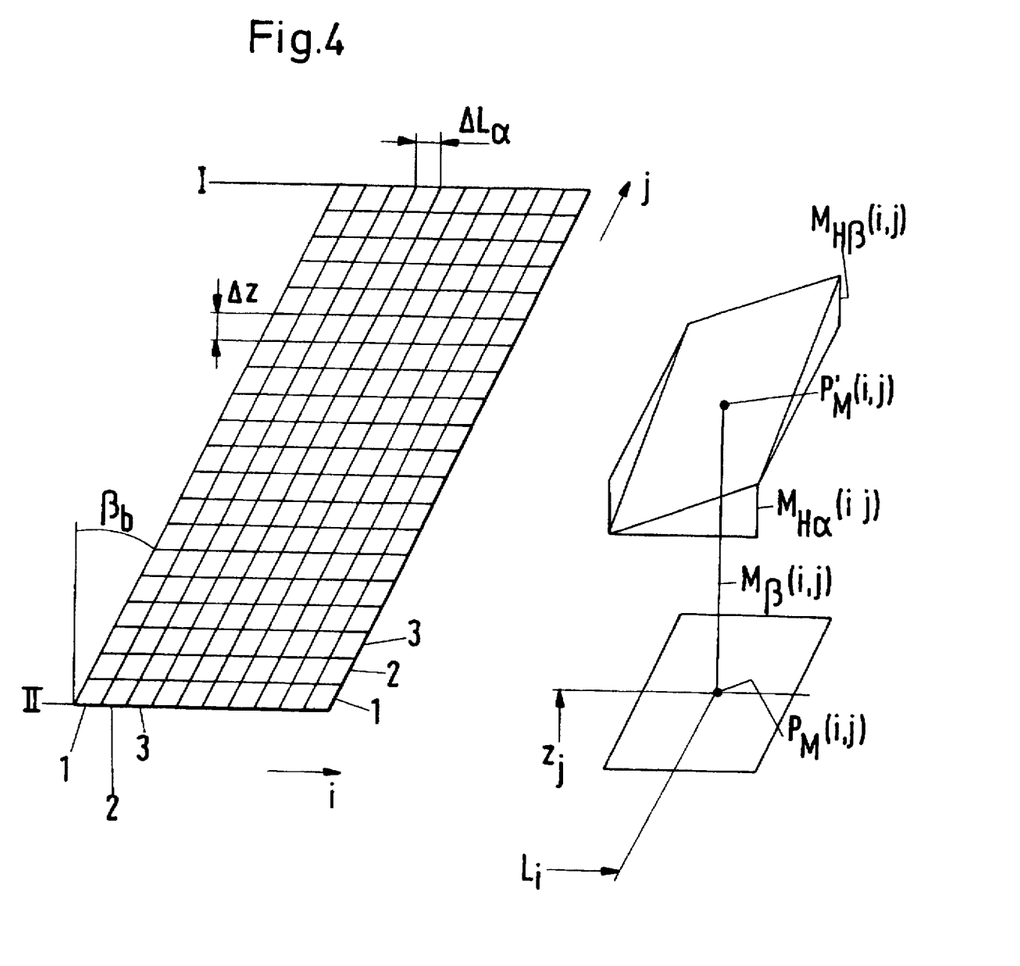
FIG. 4 is a view that shows the division of a flank in elements, presented in a plane tangential on the base cylinder of the gearing and geometrical deviations of an element.

The measuring points and the modifications are transformed into a plane tangential to the base cylinder of the unmodified gearing. Subsequently, perhaps using splines, there is determined a preferably uniform surface containing the position modified points as the gearing is divided into $N_1$-stripes of width $L_\alpha$ and $N_j$ disks with a thickness z (FIG. 4). With that there are obtained in the above-mentioned tangential plane as area elements parallelograms with side lengths $L_\alpha$ and $z/\cos \beta_b$. The center point $P_M$ (i, j) of the element (i, j) has the coordinates $(L_i+Z_j, \times\tan \beta_b)$ $z_j$. The point $P'_M$ upon the surface calculated above, lies by $M_\beta$ (i, j) over $P_M$ (i. j). The measuring cylinder of the stripe i is the cylinder concentric to the axis of the gear which for example extends through the point $P_M$ (i . j). Now for each surface element containing $P'_M$ (i. j) the gradients $M_{H\alpha}$ (i, j) in the transverse section respectively $M_{H\beta}$ (i, j) upon the measuring cylinder are determined.

The path coordinates for the machine movements are now calculated so that the generated flank contains every point $P'_M$ (i, j) and, generated for example via the eccentricity e of the tool, the corresponding $M_{H\alpha}$ (i, j) as well as generated via a corresponding additional rotation, the required $M_{H\beta}$ (i, j). The calculation procedure is iterative. It is naturally also possible to generate $M_{H\alpha}$ (i, j) via $\Delta a$ respectively via $\Delta\eta$ or via a combination of $\Delta e$, $\Delta a$, and $\Delta\eta$.

If the path coordinates for a stripe are fixed, the initial angle of workpiece rotation is to be determined. For that the stock per flank $q_r$ ascertained in an element of the stripe is calculated and compared with the design value at this location. The necessary rotation of the workpiece for positioning for machining of the stripe is $\Delta\psi=q_t/r_b$.

The procedure described by the foregoing is subsequently applied to all stripes of the left flank and the right flank of the gearing. Finally the path coordinates are loaded into the control of the machine and the machining is performed accordingly. Each stripe is separately generated, accordingly by each stroke of the tool upon each left flank respectively right flank one stripe is generated.

There are flanks with modifications which in a discontinuous profile method cannot be produced in one pass. These include, for example, flanks of which predetermined regions are to be set back relative to the remaining part of the flank. The remaining part is designated in the following as the main part of the flank. In simple situations the portions to be set back can again be described as involute helicoids.

The Topoflex-method is also suitable for generation of more complicated flank set backs. In such situations the main part of the gearing is initially machined, corresponding to the required topography perhaps conventionally in a single or double flank operation. In one or more further passes the desired setback is generated. The set backs are generated separately with adapted tool and workpiece positioning as well as adapted machine movement.

It is proposed to describe the boundary between the main part and the set back part of the flank, for example in a plane tangential on the base cylinder, and to fix either as to a cylinder concentric to the gearing axis, for example the tip form cylinder and/or the root form cylinder, upon which the course of the set back for example, in the form $M_\beta$ (z) is described or in a transverse plane, for example in the vicinity of the plane I and/or II, in which the course of the set back for example in the form $F_\alpha$ ($L_y$) is described. $L_y$ is the length of roll to the point with the random radius $r_y$ (see DIN 3960).

From these data the path of the machine, accordingly, for examples $\Delta e$ (z) and $\Delta\phi$ (z) for fixed values a and $\eta$ is calculated iteratively and additionally the necessary rotation of the workpiece is determined as a variation of the initial angle of workpiece rotation $\Delta\psi$. As set forth in the foregoing, there is obtained $\Delta\psi$ from the comparison of the stock per flank $q_t$ to be expected based on the selected setting data and paths for the machine movements at a particular location on the gearing with the design value for $q_t$ at this location.

Figure 5:
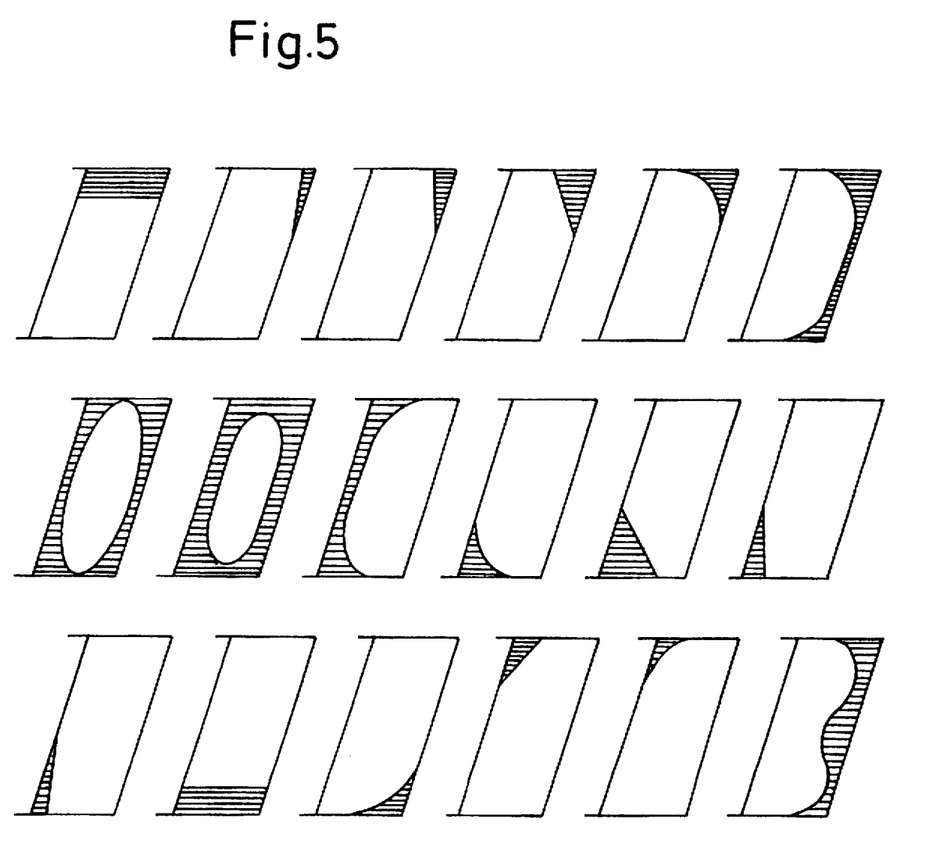
FIG. 5 is a view that sets forth sample illustrations of boundary lines between a main part of a flank and set back areas realized according to the Topoflex method of the present invention.

According to the Topoflex-method there can be realized practically by any boundary between the main part of the flank and the set-back region; FIG. 5 shows some examples. Naturally, the shape and amount of the set backs desired on the cylindrical gearing can practically be selected at random.

Figure 6:
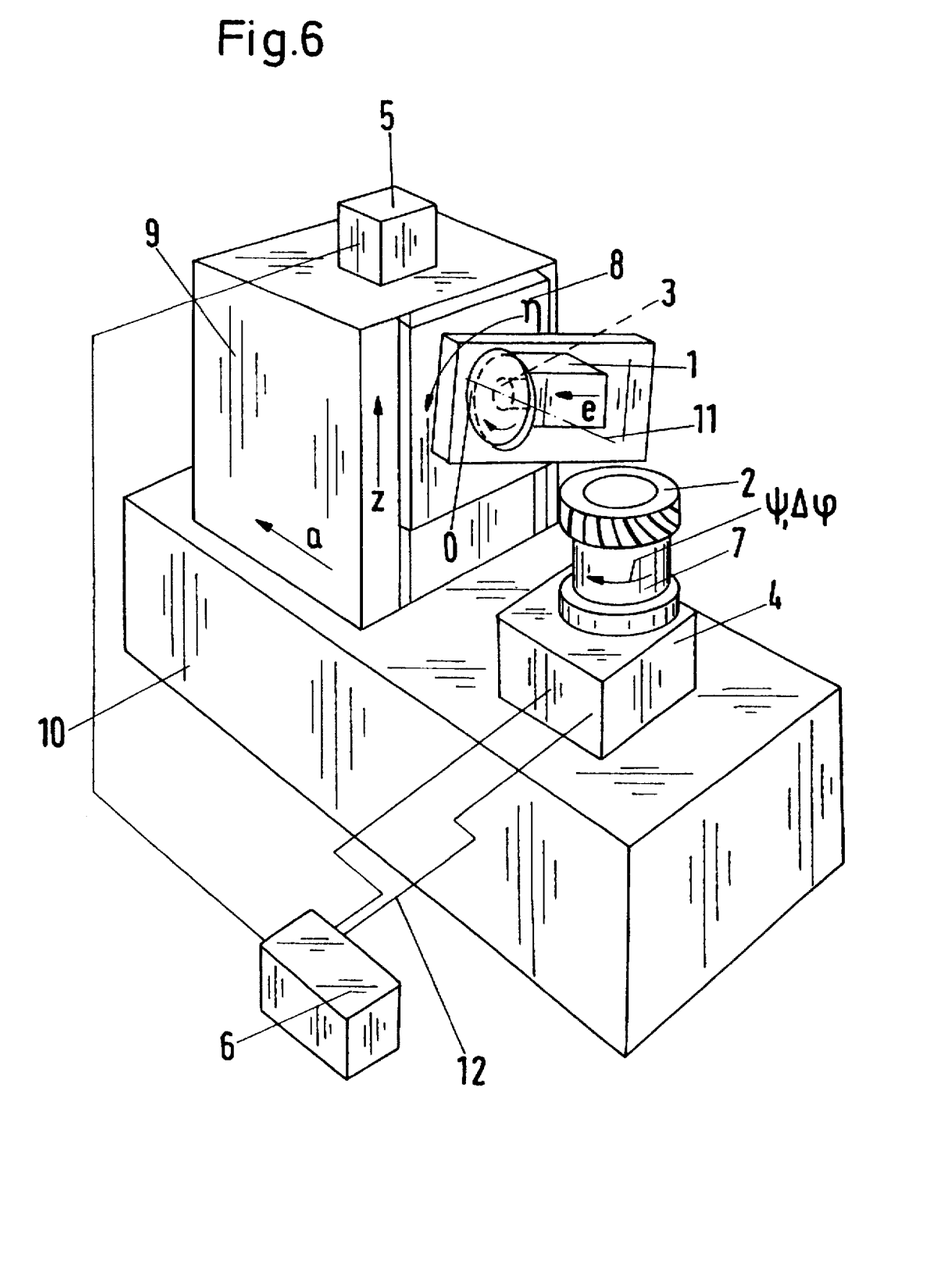
FIG. 6 shows an apparatus in a perspective view of a machine for carrying out the method in accordance with the present invention.

FIG. 6 shows a machine for carrying out the described method. The machine has a drive 1 for a tool spindle 3 upon which the tool 0 is located. The cutting speed is generated with the drive 1 for the rotation of the tool spindle 3. The workpiece 2 that is to be machined is secured upon a table 7 which can be rotated about its axis with a drive 4. The drive 1 is mounted on an axial slide 8 which is movable in the direction of the workpiece axis on a column 9. The column 9 itself is movable upon a machine bed 10 perpendicular to the direction of the movement of the axial slide 8. Finally, the drive 1 can be swivelled about an axis 11 located perpendicular to the displacement direction of the axial slide 8. Upon the column 9 there is a drive 5 for the movement of the axial slide 8 in direction of the workpiece axis. The tool 0 is movable in the direction of the axis of its rotation, i.e. perpendicular to the axis 11. For producing the screw movement between the tool 0 and the workpiece 2 there are means 4 through 6 provided. The drives 4 and 5 are connected to a control 6, which processes the signals obtained from the drives 4 and 5 and outputs a control signal 12 to the drive 4 for rotation of the workpiece 2.

For producing the screw movement between the tool 0 and workpiece 2 there is carried out a relative shifting between the tool 0 and the workpiece 2 in the direction of the workpiece axis z and a rotation of the workpiece 2 corresponding to the lead H of the screw. In the illustrated sample embodiment, the tool 0 is shifted the required distance by means of the drive 5 and the axial slide 8 in the direction of the workpiece axis z whereby simultaneously the drive 4 rotates the workpiece to the required extent. The measured values required for this are received by the control 6 from the drives 4 and 5, via the control signal 12, then drive 4, and simultaneously, the workpiece 2 are rotated in order to obtain the desired lead. The change of the center distance $\Delta a$ is produced by movement of the column 9 upon the machine bed 10 radially as to the workpiece 2. With the rotation of the workpiece 2 by means of the drive 4, the initial angle of workpiece rotation $\psi$ and respectively, the additional rotation $\Delta\phi$ of the workpiece 2, can be produced. The adjustment of the eccentricity e occurs via shifting of the drive 1 of the tool 0 in the direction of the axis of the tool 0, while the drive 1 with the tool 0 is rotated about the axis 11 for adjustment of the swivel angle $\eta$.

What is claimed is:

1. A method of machining tooth flanks in a workpiece by grinding or milling in a single flank process with a machine carrying a profile disk-tool, the workpiece and the tool each having an axis and a center, the tool being positioned relative to the workpiece by setting data, the setting data including a center distance (a) defined by the distance between the axes of the workpiece and the tool, an eccentricity (e) of the tool defined by the distance between center of the tool and the crossing point of the axes of the tool and the workpiece, and a swivel angle ($\eta$) of the axis of the tool defined by 90° minus the crossing angle of the axes of the tool and the workpiece, the machine rotating the tool so as to generate a cutting speed therein, the machine also producing a screw movement to produce helical flanks in the workpiece defined by an angle of rotation ($\phi$) which is basically proportional to a displacement (z) of an axial slide of the machine, the machine producing simple helix modified tooth flanks in the workpiece by performing the step of:

adapting the center distance ($\Delta a$) and the angle of rotation ($\Delta\phi$) of the workpiece both depending upon the displacement (z) of the axial slide of the machine so that a prescribed distortion of the tooth flanks results.

2. A method of machining tooth flanks in a workpiece by grinding or milling in a single flank process with a machine carrying a profile disk-tool, the workpiece and the tool each having an axis and a center, the tool being positioned relative to the workpiece by setting data, the setting data including a center distance (a) defined by the distance between the axes of the workpiece and the tool, an eccentricity (e) of the tool defined by the distance between center of the tool and the crossing point of the axes of the tool and the workpiece, and a swivel angle ($\eta$) of the axis of the tool defined by 90° minus the crossing angle of the axes of the tool and the workpiece, the machine rotating the tool so as to generate a cutting speed therein, the machine also producing a screw movement in the workpiece defined by an angle of rotation ($\phi$) which is basically proportional to a displacement (z) of an axial slide of the machine, the machine producing simple helix modified tooth flanks in the workpiece by performing the step of:

adapting the center distance ($\Delta a$) and the eccentricity ($\Delta e$) of the tool and the angle of rotation ($\Delta\phi$) of the workpiece, all depending upon the displacement (z) of the axial slide of the machine so that a prescribed distortion of the tooth flanks results.

3. A method of machining tooth flanks in a workpiece by grinding or milling in a single flank process with a machine carrying a profile disk-tool, the workpiece and the tool each having an axis and a center, the tool being positioned relative to the workpiece by setting data, the setting data including a center distance (a) defined by the distance between the axes of the workpiece and the tool, an eccentricity (e) of the tool defined by the distance between center of the tool and the crossing point of the axes of the tool and the workpiece, and a swivel angle ($\eta$) of the axis of the tool defined by 90° minus the crossing angle of the axes of the tool and the workpiece, the machine rotating the tool so as to generate a cutting speed therein, the machine also producing a screw movement in the workpiece defined by an angle of rotation ($\phi$) which is basically proportional to a displacement (z) of an axial slide of the machine, the machine producing simple helix modified tooth flanks in the workpiece by performing the step of:

adapting the center distance ($\Delta a$) and the swivel angle ($\Delta\eta$) of the axis of the tool and the angle of rotation ($\Delta\phi$) of the workpiece, all depending upon the displacement (z) of the axial slide of the machine, so that a prescribed distortion of the tooth flanks results.

4. A method of machining tooth flanks in a workpiece by grinding or milling in a single flank process with a machine carrying a profile disk-tool, the workpiece and the tool each having an axis and a center, the tool being positioned relative to the workpiece by setting data, the setting data including a center distance (a) defined by the distance between the axes of the workpiece and the tool, an eccentricity (e) of the tool defined by the distance between center of the tool and the crossing point of the axes of the tool and the workpiece, and a swivel angle ($\eta$) of the axis of the tool defined by 90° minus the crossing angle of the axes of the tool and the workpiece, the machine rotating the tool so as to generate a cutting speed therein, the machine also producing a screw movement in the workpiece defined by an angle of rotation ($\phi$) which is basically proportional to a displacement (z) of an axial slide of the machine, the machine producing simple helix modified tooth flanks in the workpiece by performing the step of:

changing the angle of rotation ($\Delta\phi$) of the workpiece and the eccentricity ($\Delta e$) of the tool, depending upon the displacement (z) of the axial slide of the machine so that a prescribed distortion of the tooth flanks results.

5. A method of machining tooth flanks in a workpiece by grinding or milling in a single flank process with a machine carrying a profile disk-tool, the workpiece and the tool each having an axis and a center, the tool being positioned relative to the workpiece by setting data, the setting data including a center distance (a) defined by the distance between the axes of the workpiece and the tool, an eccentricity (e) of the tool defined by the distance between center of the tool and the crossing point of the axes of the tool and the workpiece, and a swivel angle ($\eta$) of the axis of the tool defined by 90° minus the crossing angle of the axes of the tool and the workpiece, the machine rotating the tool so as to generate a cutting speed therein, the machine also producing a screw movement in the workpiece defined by an angle of rotation ($\phi$) which is basically proportional to a displacement (z) of an axial slide of the machine, the machine producing simple helix modified tooth flanks in the workpiece by performing the step of:

changing the angle of rotation ($\Delta\phi$) of the workpiece and swivel angle ($\Delta\eta$) of the axis of the tool, both depending upon the displacement (z) of the axial slide of the machine so that a prescribed distortion of the tooth flanks results.

6. A method of machining helix modifications with prescribed distortion in the flanks of a workpiece in a double flank process with a machine carrying a profile disk-tool, the workpiece and the tool each having an axis and a center, the tool being positioned relative to the workpiece by setting data, the setting data including a center distance (a) defined by the distance between the axes of the workpiece and the tool, an eccentricity (e) of the tool defined by the distance between center of the tool and the crossing point of the axes of the tool and the workpiece, and a swivel angle ($\eta$) of the axis of the tool defined by 90° minus the crossing angle of the axes of the tool and the workpiece, the machine rotating the tool so as to generate a cutting speed therein, the machine also carrying out a screw movement to produce helical flanks in the workpiece defined by an angle of rotation ($\phi$) which is basically proportional to a displacement (z) of an axial slide of the machine, comprising the steps of:

utilizing a tool with a desired profile and changing the center distance ($\Delta a$) depending upon the displacement (z) of the axial slide of the machine;

generating desired distortions in the flanks of the workpiece by simultaneously changing the eccentricity ($\Delta e$) of the tool and the angle of rotation ($\Delta\phi$) of the workpiece both depending upon the (z) of the axial slide of the machine;

compensating for profile-slope deviations ($f_{H\alpha}$) caused by machining traces on the left and right flanks of the workpiece by changing the center distance (a) by a constant amount and adapting the tool geometry to a desired tooth thickness so that influence caused by changing the setting datum (a) on tooth thickness is compensated for.

7. A method of machining helix modifications with prescribed distortion in the flanks of a workpiece in a double flank process with a machine carrying a profile disk-tool, the workpiece and the tool each having an axis and a center, the tool being positioned relative to the workpiece by setting data, the setting data including a center distance (a) defined by the distance between the axes of the workpiece and the tool, an eccentricity (e) of the tool defined by the distance between center of the tool and the crossing point of the axes of the tool and the workpiece, and a swivel angle ($\eta$) of the axis of the tool defined by 90° minus the crossing angle of the axes of the tool and the workpiece, the machine rotating the tool so as to generate a cutting speed therein, the machine also carrying out a screw movement to produce helical flanks in the workpiece defined by an angle of rotation ($\phi$) which is basically proportional to a displacement (z) of an axial slide of the machine, comprising the steps of:

generating left and right simple helix modified flanks in the workpiece by utilizing a tool with a desired profile and by changing the center distance ($\Delta a$) depending upon the displacement (z) of the axial slide of the machine;

generating distortions in the flanks of the workpiece by simultaneously changing the eccentricity ($\Delta e$) of the tool and the angle of rotation ($\Delta\phi$) of the workpiece both depending upon the (z) of the axial slide of the machine;

compensating for profile-slope deviations ($f_{H\alpha}$) caused by machining traces on the left and right flanks of the workpiece by changing the swivel angle ($\eta$) of the axis of the tool by a constant amount; and adapting the tool geometry to a desired tooth thickness so that influence caused by changing the setting datum ($\eta$) on tooth thickness is compensated for.

8. The method of machining tooth flanks in a workpiece of claim 1 wherein the tooth flanks are divided into at least two surface areas which are produced in separate processes with different machine movements, and wherein two parameters selected from the group of parameters consisting of center distance (a), eccentricity (e), swivel angle ($\eta$), and initial angle of workpiece rotation ($\psi$), are selected for generating the respective surface areas.

9. The method of machining tooth flanks in a workpiece of claim 2 wherein the tooth flanks are divided into at least two surface areas which are produced in separate processes with different machine movements, and wherein two parameters selected from the group of parameters consisting of center distance (a), eccentricity (e), swivel angle ($\eta$), and initial angle of workpiece rotation ($\psi$), are selected for generating the respective surface areas.

10. The method of machining tooth flanks in a workpiece of claim 3 wherein the tooth flanks are divided into at least two surface areas which are produced in separate processes with different machine movements, and wherein two parameters selected from the group of parameters consisting of: center distance (a), eccentricity (e), swivel angle ($\eta$), and initial angle of workpiece rotation ($\psi$), are selected for generating the respective surface areas.

11. The method of machining tooth flanks in a workpiece of claim 4 wherein the tooth flanks are divided into at least two surface areas which are produced in separate processes with different machine movements, and wherein two parameters selected from the group of parameters consisting of center distance (a), eccentricity (e), swivel angle ($\eta$), and initial angle of workpiece rotation ($\psi$), are selected for generating the respective surface areas.

12. The method of machining tooth flanks in a workpiece of claim 5 wherein the tooth flanks are divided into at least two surface areas which are produced in separate processes with different machine movements, and wherein two parameters selected from the group of parameters consisting of center distance (a), eccentricity (e), swivel angle ($\eta$), and initial angle of workpiece rotation ($\psi$), are selected for generating the respective surface areas.

13. The method of claim 6, wherein the profile-slope deviation ($f_{H\alpha}$) is dependent upon instantaneous position (z) of the axial slide of the machine, and wherein a variation in the profile-slop deviation ($f_{H\alpha}$) caused by changing the center distance ($\Delta$a) is compensated for by adapting the swivel angle ($\Delta\eta$) depending upon the displacement (z) of the axial slide of the machine.

14. The method of claim 7, wherein the profile-slope deviation ($f_{H\alpha}$) is dependent upon instantaneous position (z) of the axial slide of the machine, and wherein a variation in the profile-slop deviation ($f_{H\alpha}$) caused by changing the center distance ($\Delta$a) is compensated for by adapting the swivel angle ($\Delta\eta$) depending upon the displacement (z) of the axial slide of the machine.

15. The method of claim 1, wherein a first region of the tooth flanks is set back by a specified amount in comparison to a second region of the tooth flanks, and wherein the method comprises the further step of:

iteratively simulating the amount by which the first region of the tooth flanks is set back relative to the second region of the tooth flanks and the line of changeover between the two regions by adjusting the setting data.

16. The method of claim 2, wherein a first region of the tooth flanks is set back by a specified amount in comparison to a second region of the tooth flanks, and wherein the method comprises the further step of:

iteratively simulating the amount by which the first region of the tooth flanks is set back relative to the second region of the tooth flanks and the line of changeover between the two regions by adjusting the setting data.

17. The method of claim 3, wherein a first region of the tooth flanks is set back by a specified amount in comparison to a second region of the tooth flanks, and wherein the method comprises the further step of:

iteratively simulating the amount by which the first region of the tooth flanks is set back relative to the second region of the tooth flanks and the line of changeover between the two regions by adjusting the setting data.

18. The method of claim 4, wherein a first region of the tooth flanks is set back by a specified amount in comparison to a second region of the tooth flanks, and wherein the method comprises the further step of:

iteratively simulating the amount by which the first region of the tooth flanks is set back relative to the second region of the tooth flanks and the line of changeover between the two regions by adjusting the setting data.

19. The method of claim 5, wherein a first region of the tooth flanks is set back by a specified amount in comparison to a second region of the tooth flanks, and wherein the method comprises the further step of:

iteratively simulating the amount by which the first region of the tooth flanks is set back relative to the second region of the tooth flanks and the line of changeover between the two regions by adjusting the setting data.

* * * * *